April 28, 1931. J. P. McLIMANS 1,802,664
WATER COOLED COLLAPSIBLE PORT
Filed May 19 1928
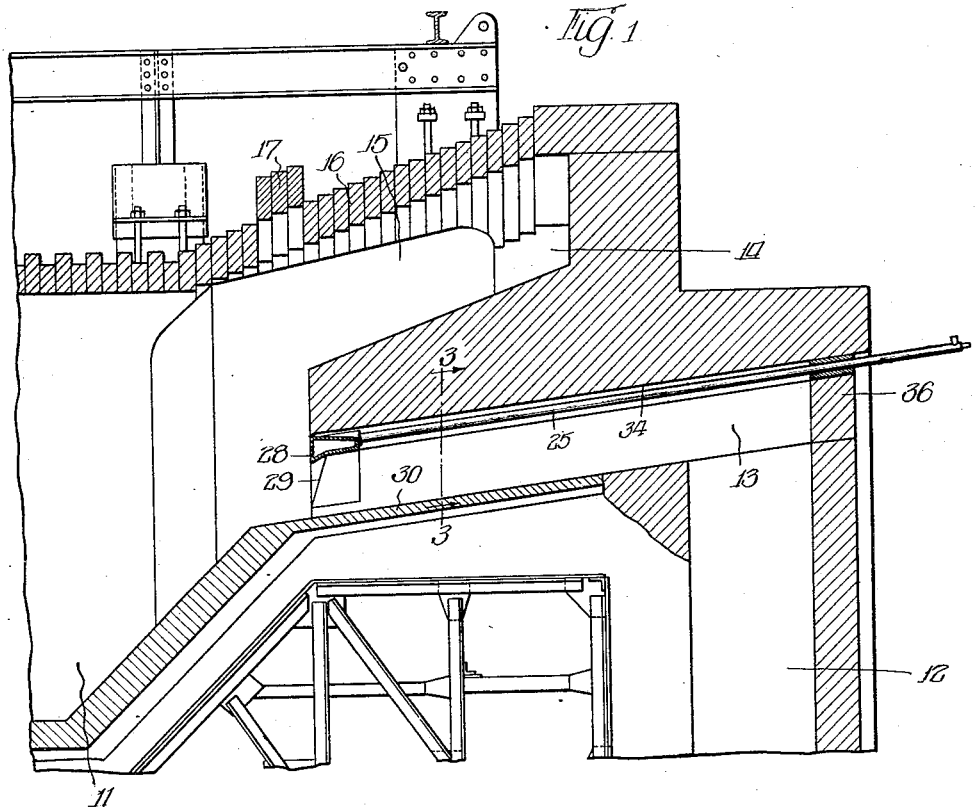
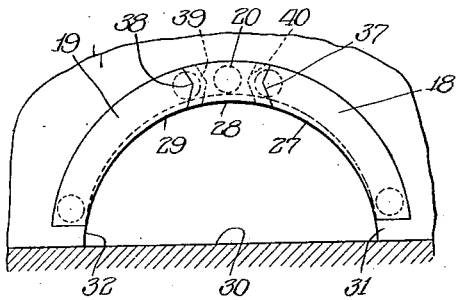 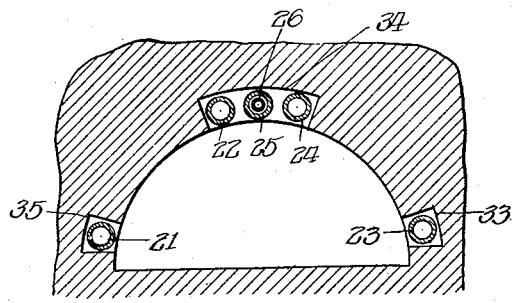
Inventor:
John P. McLimans,
By ... Anthony Heine
Atty Patented Apr. 28, 1931

1,802,664

UNITED STATES PATENT OFFICE

JOHN P. McLIMANS, OF DULUTH, MINNESOTA

WATER-COOLED COLLAPSIBLE PORT

Application filed May 19, 1928. Serial No. 279,107.

This invention relates to a new and improved water cooled collapsible port, and more particularly to a water cooled port for use in open hearth furnaces or the like.

In my prior application, Serial No. 208,933, filed July 28, 1927, I have disclosed a collapsible port for the same purpose and the present application discloses a construction which is in the nature of an improvement over that described in my prior application.

It has been customary in open hearth and similar furnaces to provide water cooling means for the protection of the ports. The furnaces are reversible and on the outgoing end the ports are subjected to the erosive action of the hot products of combustion. If unprotected, the ports, therefore, wear away during the life of the furnace and fail to adequately direct the incoming air and gas upon the bath. Prior types of cooling constructions have been permanently secured into the port structure and their repair or replacement has, therefore, necessitated a complete cooling of the furnace so that workmen might enter the furnace and remove and replace the necessary brickwork to permit removal and replacement of the water cooling structure. Such water cooling structures have also been of considerable size which has caused an undue amount of cooling of the gases with consequent heat loss in the operation of the furnace.

It is an object of the present invention to provide a collapsible port structure which may be readily removed and replaced from the furnace without material interference with the furnace operation.

It is an additional object to provide a construction of this character associated with a furnace having a removable roof portion, whereby the insertion and removal of the water cooling members may be facilitated.

It is an additional object to provide a water cooling structure the lower edges of which are located above the lower surfaces of the port, whereby said cooling members are not locked in place by slag deposited on the port floor.

It is also an object to provide a construction in which a water cooled lip is provided for directing the gas downwardly upon the bath in the furnace.

Other and further objects will appear as the description proceeds.

I have illustrated a preferred embodiment of my invention in the accompanying drawings, in which Figure 1 is a fragmentary vertical section showing an end of a furnace with my water cooled construction applied thereto;

Figure 2 is an end view of the port of Figure 1 as seen from the left; and

Figure 3 is a section taken on line 3—3 of Figure 1.

The furnace shown comprises the hearth 11, gas uptake 12 and gas port 13. The air uptakes 14 discharge into the air port 15 below the furnace roof 16. The roof 16 is provided with a removable section 17. The water cooling construction comprises the side members 18 and 19 and the key member 20. The side member 18 is provided with the water inlet and outlet pipes 21 and 22 and the member 19 is provided with the similar pipes 23 and 24. The key section 20 is provided with the concentric water inlet and outlet pipes 25 and 26.

The three members 18, 19 and 20 are provided with downwardly extending lips 27, 28 and 29 which together form a downwardly inclined lip extending over the entire outer edge of the water cooling assembly. As clearly shown in the drawings, the lower edges of the sections 18 and 19 are supported above the floor 30 of the port upon the shoulders 31 and 32. Suitable recesses 33, 34 and 35 are formed in the port walls and roof to receive the water cooling pipes which extend outwardly through the rear wall of the port. The section 36 of the rear wall of the port is removable for inserting and replacing the water cooled construction.

In installing the water cooled construction, after the brickwork has been constructed and formed with suitable recesses for the water cooling members and the pipes, the two lateral members are inserted from the rear end of the port and lifted up to fit into the recesses formed in the inner surfaces of the nose of the port. To facilitate the lifting of the water cooling members into the recesses, the portion 17 of the roof is made removable and suitable grab hooks may be lowered through this opening to lift the sections 18 and 19 so that they may be withdrawn rearwardly into their recesses.

The central key member 20 is next inserted from the rear and lifted upwardly so that it may be drawn back to wedge apart the members 18 and 19. The meeting surfaces 37 and 38, as shown in Figure 2, are so formed as to hold the parts in proper relation when the section 20 is drawn rearwardly into place. As indicated by the broken lines 39 and 40, the rear portion of the member 20 is narrower than the front portion so that drawing the member 20 rearwardly by means of the pipe 25, serves to wedge the members 18 and 19 apart. After the water cooling assembly has been installed, the rear wall 36 of the port is replaced and the roof section 17 also replaced.

During the operation of the furnace the lip 27, 28 and 29 serves to direct the gas downwardly so as to form a proper flame directed upon the bath. Since this lip structure is water cooled it is substantially permanent and is not worn away by the heated gases so that the flame direction is maintained substantially constant. During the operation of the furnace some slag builds up on the floor 30 of the port near the nose of the port, but due to the fact that the lower edges of the members 18 and 19 rest on the shoulders 31 and 32, this slag will not bind the water cooling members in place.

The water cooling assembly may be removed for repair or replacement by driving the key member 20 forward by means of the pipe 25 and it may be then lowered and withdrawn through the rear of the port. The lateral members 18 and 19 may then be similarly withdrawn. Since it is not necessary for any workmen to enter the furnace to remove or replace the brickwork upon the removal and replacement of the water cooled structure, it is not necessary to delay the furnace operation by cooling down the furnace. The replacement may be accomplished in a comparatively short period of time while the furnace is still hot and thus the delay to repair is greatly reduced over that incident to replacement or repair of the type of structures now in general use.

The location of the water carrying pipes in the top of the port, extending lengthwise of the port, is also an important feature as it protects the roof of the port and prevents the gases from cutting away the port roof just back of the water cooling element as is often the case with usual types of structures.

While I have shown one preferred form of my construction by way of example, it is capable of changes and modifications to meet different conditions, and adapt it to different structures, and I contemplate such changes and modifications as come within the spirit and scope of the appended claims.

I claim:

1. In a furnace port construction, an arcuate recess inside the port at the mouth thereof, said recess terminating upon shoulders located above the floor of the port and arcuate water cooling means located in said recess and removable from the outside of the furnace.

2. In a furnace port construction, an arcuate recess inside the port at the mouth thereof, said recess terminating upon shoulders located above the floor of the port, and a water cooling assembly comprising a plurality of elements in arch formation supported on said shoulders in said recess and removable from the outside of the furnace.

3. In a furnace port construction, an arcuate recess inside the mouth of the port, a water cooling assembly in said recess, and a lip upon the outer edge of said water cooling assembly, said lip extending downwardly into the path of the gases to deflect them away from the roof.

4. In a furnace port construction, an arcuate recess inside the mouth of the port, a water cooling assembly comprising a plurality of elements in arch formation in said recess, lips on the outer edges of each element, said lips matching to form a continuous arch shaped lip, said lip extending downwardly into the path of the gases to deflect them away from the roof.

5. In a furnace construction, a hearth, a roof, air and gas ports terminating at a nose portion of said furnace, water cooling means detachably held to said nose portion, a portion of the rear wall of the gas port and a portion of said roof being removable to facilitate the insertion and removal of the water cooling means, said cooling means being removable from the outside of the furnace through one of said openings.

6. In a furnace construction, a hearth, a roof, air and gas ports terminating at a nose portion of said furnace, water cooling means detachably held to said nose portion, a portion of the rear wall of the gas port and a portion of said roof being removable to facilitate the insertion and removal of the water cooling means, circulating pipes connected to a part of said water cooling means and extending along the upper part of said gas port and through the removable portion of the rear wall, said cooling means being removable from the outside of the furnace through one of said openings.

7. In a furnace port construction, a floor and an arcuate roof including sides depending to said floor forming a nose portion, said roof having an arcuate recess at the nose portion, said recess terminating at shoulders located above the level of said floor and water cooling means detachably mounted in said recess and removable from the outside of the furnace.

8. In a furnace port construction, comprising a floor and an arcuate roof, said roof including a nose portion, water cooling means for said port mounted in said nose portion of said roof, said means including an inwardly extending lip at the outer edge thereof, the lower face of said lip being inclined and exposed to the flow of the gases to act as a baffle and direct the gases downwardly.

9. In a furnace construction, a hearth, a roof, air and gas ports terminating at a nose portion of said furnace, members forming lower portions of said nose and leaving a space thereabove which narrows downwardly, a cooling element so shaped as to be slidable horizontally into said space but not removable downwardly therefrom, and a wall portion that is removable to permit insertion and removal of said cooling element; said roof having a portion that is removable to permit raising the cooling element to the proper level for its horizontal movement into said space.

10. In a furnace construction, a hearth, a roof, air and gas ports terminating at a nose portion of said furnace, cooling members forming lower portions of said nose and leaving a space thereabove which narrows downwardly, a cooling element so shaped as to be slidable horizontally into said space but not removable downwardly therefrom, and a wall portion that is removable to permit insertion and removal of said cooling element; said roof having a portion that is removable to permit raising the cooling element to the proper level for its horizontal movement into said space.

Signed at Duluth, Minnesota, this 12th day of May, 1928.

JOHN P. McLIMANS.